United States Patent [19]

Frey et al.

[11] Patent Number: 4,824,651
[45] Date of Patent: Apr. 25, 1989

[54] PROCESS FOR PREPARING SILICON CARBIDE FIBERS

[75] Inventors: Volker Frey; Bernd Pachaly; Norbert Zeller, all of Burghausen, Fed. Rep. of Germany

[73] Assignee: Wacker-Chemie GmbH, Munich, Fed. Rep. of Germany

[21] Appl. No.: 158,801

[22] Filed: Feb. 22, 1988

[30] Foreign Application Priority Data

Mar. 6, 1987 [DE] Fed. Rep. of Germany ....... 3707225

[51] Int. Cl.$^4$ .............................................. C01B 31/36
[52] U.S. Cl. .................................... 423/345; 556/430
[58] Field of Search ......................... 423/345; 556/430

[56] References Cited

U.S. PATENT DOCUMENTS 4,497,787 2/1985 Schilling et al. ............... 423/345
4,631,179 12/1986 Smith ............................. 423/345

FOREIGN PATENT DOCUMENTS 23096 1/1981 European Pat. Off. ........... 423/345

Primary Examiner—Jack Cooper

[57] ABSTRACT

A process for preparing silicon carbide fibers, which comprises spinning a copolymer obtained by reacting at least one disilane of the formula $$R_2R^1Si_2(OCH_3)_3,$$

in which R represents the same or different alkyl, alkenyl or aryl radicals and $R^1$ represents the same or different alkyl radicals, which may optionally be mixed with a compound of the formula $$R_2Si_2(OCH_3)_4$$

in which R is the same as above, with at least one compound of the formula $$R_2R^2SiH$$

in which R is the same as above and $R^2$ represents a methoxy radical or is the same as R, in the presence of at least one compound of the formula $$MOR$$

in which R is the same as above and M represents an alkali metal, and a compound of the formula $$HO\text{--}[(R^1R^3SiO)_x(R_2^1SiO)_y]_n\text{--}H$$

in which $R^1$ is the same as above, $R^3$ represents the same or different alkenyl radicals, x is in the range of from 0.5 to 1.5, y is in the range of from 3 to 5 and n is in the range of from 500 to 2,000 into fibers and thereafter reacting the fibers under an inert atmosphere or in vacuo at temperatures in the range of from 800° to 1,300° C.

4 Claims, No Drawings

PROCESS FOR PREPARING SILICON CARBIDE FIBERS

The present invention relates to silicon carbide fibers and more particularly to a process for preparing silicon carbide fibers.

BACKGROUND OF THE INVENTION

Silicon carbide fibers and processes for preparing silicon carbide fibers from organometallic polymers are well known. These fibers are prepared from polysilanes, polycarbosilanes or polysilazanes. The processes for preparing silicon carbide fibers all have a common feature of spinning a suitable polymer with subsequent pyrolysis under an inert gas or in vacuo.

It is an object of the present invention to prepare stable silicon carbide fibers having high tensile strength. Another object of the present invention is to provide thermally stable silicon carbide fibers. Still another object of the present invention is to provide chemically stable silicon carbide fibers. A further object of the present invention is to provide a process for preparing thermally and chemically stable silicon carbide fibers having high tensile strength.

SUMMARY OF THE INVENTION

The foregoing objects and others which will become apparent from the following description are accomplished in accordance with this invention, generally speaking, by providing a process for preparing silicon carbide fibers which comprises spinning a copolymer obtained by reacting at least one disilane of the formula $$R_2R^1Si_2(OCH_3)_3$$

in which R represents the same or different alkyl, alkenyl or aryl radicals and $R^1$ represents the same or different alkyl radicals, which may optionally be mixed with a compound of the formula $$R_2Si_2(OCH_3)_4$$

in which R is the same as above, with at least one compound of the formula $$R_2R^2SiH$$

in which R is the same as above and $R^2$ represents a methoxy radical or is the same as R, in the presence of at least one compound of the formula $$MOR$$

in which R is the same as above and M represents an alkali metal, and a compound of the formula $$HO\!-\!\!\left[(R^1R^3SiO)_x(R_2^1SiO)_y\right]_{\!n}\!\!-\!\!H$$

in which $R^1$ is the same as above, $R^3$ is the same or different alkenyl radicals, x is in the range of from 0.5 to 1.5, y is in the range of from 3 to 5 and n is in the range of from 500 to 2,000, into fibers and thereafter reacting the fibers under an inert atmosphere or in vacuo at temperatures in the range of from 800° to 1,300° C.

In a preferred embodiment of this invention, the copolymer is obtained by reacting at least one disilane of the formula $$R_2R^1Si_2(OCH_3)_3$$

in which R and $R^1$ are the same as above, which may optionally be mixed with a compound of the formula $$R_2Si_2(OCH_3)_4$$

in which R is the same as above, with at least one compound of the formula $$R_2R^2SiH$$

in which R is the same as above and $R^2$ represents a methoxy radical or is the same as R, in the presence of at least one compound of the formula $$MOR$$

in which R is the same as above and M represents an alkali metal, a compound of the formula $$HO\!-\!\!\left[(R^1R^3SiO)_x(R_2^1SiO)_y\right]_{\!n}\!\!-\!\!H$$

in which $R^1$ is the same as above, $R^3$ is the same or different alkenyl radicals, x is in the range of from 0.5 to 1.5, y is in the range of from 3 to 5 and n is in the range of from 500 to 2,000, and a compound or a mixture of compounds of the formulas $$\text{-}\!\!\left[(R_3^1SiO)_a(R_2^1R^3SiO)_b(SiO_2)_c\right]\!\!\text{-}_d$$

$$R^3R_2^1Si\!-\!(R^1SiO)_e\!-\!OSiR_2^1R^3 \text{ and}$$

$$R^1O\!-\!(R^1O)_2TiO\!-\!_f Ti(OR^1)_3,$$

in which $R^1$ and $R^3$ are the same as above, a is in the range of from 0.3 to 0.5, b is in the range of from 0.01 to 0.1, c is in the range of from 0.5 to 0.7, d is in the range of from 10 to 100, e is in the range of from 500 to 600 and f is in the range of from 1 to 1,000.

DESCRIPTION OF THE INVENTION

The copolymer which is spun into fibers is obtained by reacting at least one disilane of the formula $$R_2R^1Si_2(OCH_3)_3$$

which may optionally be mixed with a compound of the formula $$R_2Si_2(OCH_3)_4$$

with at least one compound of the formula $$R_2R^2SiH$$

in the presence of at least one compound of the formula $$MOR$$

and a compound of the formula $$HO\!-\!\!\left[(R^1R^3SiO)_x(R_2^1SiO)_y\right]_{\!n}\!\!-\!\!H,$$

where R, $R^1$, $R^2$, $R^3$, M, x, y and n are the same as above, and thereafter the resultant fibers are heated in an inert atmosphere or in vacuo at a temperature of from 800° to 1,300° C.

In addition to the compounds mentioned above, a compound or mixture of compounds having the formulas $$[(R_3^1SiO)_a(R_2^1R^3SiO)_b(SiO_2)_c]_d$$

$$R^3R_2^1Si[R_2^1SiO]_eOSiR_2^1R^3 \text{ and}$$

$$R^1O[(R^1O)_2TiO]_fTi(OR^1)_3,$$

where $R^1$, $R^3$, a, b, c, d, e and f are the same as above, may be added to form the copolymer.

Alkyl groups represented by R, $R^1$ and $R^2$ each preferably contain 1 to 12 carbon atoms per radical, such as the methyl, ethyl, n-propyl, isopropyl, n-butyl, sec-butyl, 2-ethylhexyl and dodecyl radicals. Examples of aryl radicals represented by R and $R^2$ are the phenyl radical and xenyl radical. The methyl radical is the preferred alkyl radical represented by R, $R^1$ and $R^2$ because of its availability. The most important example of an alkenyl radical represented by R and $R^3$ is the vinyl radical.

The tert-butyl radical is another example of a radical represented by R in the compound of the formula

MOR.

The alkali metal can be lithium, sodium, potassium, rubidium or cesium. Sodium and potassium are the preferred alkali metals in the compound of the formula

MOR.

Examples of preferred disilanes are 1,1,2-trimethyl-1,2,2-trimethoxydisilane, 1-phenyl-1,2-dimethyl-1,2,2-trimethoxydisilane and 1-vinyl-1,2-dimethyl-1,2,2-trimethoxydisilane. The most important example of a compound of the formula $$R_2Si_2(OCH_3)_4$$

is 1,2-dimethyl-1,1,2,2-tetramethoxydisilane.

These disilanes are well known and their preparation is described, for example, by E. Hengge et al in "Monatshefte für Chemie" Volume 105, (1974), pages 671 to 683, W. H. Atwell et al in "Journal of Organometallic Chemistry", Volume 7, (1967), pages 71 to 78, E. Hengge et al in "Monatshefte für Chemie", Volume 99, (1968), pages 340 to 346, and H. Watanabe et al in "Journal of Organometallic Chemistry", Volume 128 (1977), pages 173 to 175.

If disilanes of the formula $$R_2Si_2(OCH_3)_4$$

are used, they are preferably employed in an amount of from 0.5 mol to 1.5 mols per mol of disilane of the formula $$R_2R^1Si_2(OCH_3)_3.$$

Examples of compounds of the formula $$R_2R^2SiH$$

which are preferably employed are dimethylmethoxysilane and diphenylmethylsilane.

The compound of the formula $$R_2R^2SiH$$

is preferably used in an amount of from 0.5 to 5 percent by weight, preferably from 2 to 4 percent by weight, based on the weight of the disilanes employed.

Specific examples of compounds of the formula

MOR are sodium methylate and potassium tert-butylate.

The compound of the formula

MOR is used as a catalyst; therefore, it is preferably used in an amount of from 0.2 to 0.5 percent by weight, based on the weight of the disilanes.

In preferred compounds of the formula $$HO[(R^1R^3SiO)_x(R_2^1SiO)_y]_nH$$

$R^1$ is a methyl radical, $R^3$ is a vinyl radical, x is in the range of from 0.5 to 1.5, y is in the range of from 3 to 5 and n is in the range of from 500 to 2,000.

These compounds are well known and their preparation is described, for example, by W. Noll, in Chemistry and Technology of Silicones, Academic Press Inc., London, 1968.

About 0.1 to 10 percent by weight, preferably from 1 to 5 percent by weight, of the compound of the formula $$HO[(R^1R^3SiO)_x(R_2^1SiO)_y]_nH$$

is preferably employed, based on the weight of the disilanes.

The reaction of at least one disilane of the formula $$R_2R^1Si_2(OCH_3)_3$$

in which R represents the same or different alkyl, alkenyl or aryl radicals and $R^1$ represents the same or different monovalent alkyl groups, which may optionally be mixed with a compound of the formula $$R_2Si_2(OCH_3)_4$$

in which R is the same as above, with at least one compound of the formula $$R_2R^2SiH$$

in which R is the same as above and $R^2$ represents a methoxy radical or R, in the presence of at least one compound of the formula

MOR in which R is the same as above and M represents an alkali metal, with a compound of the formula $$HO[(R^1R^3SiO)_x(R_2^1SiO)_y]_nH$$

in which $R^1$ is the same as above, $R^3$ represents the same or different alkenyl radicals, x is in the range of from 0.5 to 1.5, y is in the range of from 3 to 5 and n is in the range of from 500 to 2,000, is carried out after the reactants and catalyst have been mixed at temperatures of preferably from 25° C. to 220° C., and is discontinued when no additional monomeric organomethoxysilane is distilled off. This reaction is preferably carried out under the pressure of the surrounding atmosphere, that is to say, under 1,020 hPa (absolute) or about 1,020 hPa (absolute).

In examples of preferred compounds of the formula

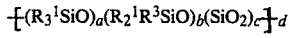

$R^1$ is a methyl radical, $R^3$ is a vinyl radical, a is in the range of from 0.3 to 0.4, b is in the range of from 0.01 to 0.1, c is in the range of from 0.5 to 0.7 and d is in the range of from 10 to 100.

These compounds are well known and their preparation has been described, for example, by W. Noll, Chemistry and Technology of Silicones, Academic Press Inc., London, 1968.

About 0.1 to 10 percent by weight, preferably from 1 to 3 percent by weight, of the compound of the formula

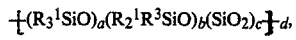

is preferably added, based on the weight of the disilanes.

In examples of preferred compounds of the formula

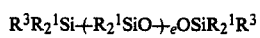

$R^1$ is a methyl, radical, $R^3$ is a vinyl radical and e is in the range of from 500 to 600.

These compounds are well known and their preparation is described, for example, by W. Noll, Chemistry and Technology of Silicones, Academic Press Inc., London, 1968.

About 0.1 to 10 percent by weight, preferably from 2 to 5 percent by weight, of the compound of the formula

is preferably added, based on the weight of the disilanes employed.

In preferred examples of compounds of the formula

$R^1$ is a butyl radical and f is in the range of from 1 to 1,000.

These compounds are well known and their preparation is described, for example, by D. C. Bradley, R. C. Mehrotra and D. P. Gaur, Metal Alkoxides, Academic Press Inc. London 1978.

About 0.1 to 10 percent by weight and more preferably from 1 to 3 percent by weight of the compound of the formula

is preferably added, based on the weight of the disilanes employed.

The copolymer of this invention is obtained by mixing at least one disilane of the formula

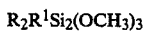

in which R and $R^1$ are the same as above, which may optionally be mixed with a compound of the formula

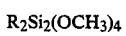

in which R is the same as above with at least one compound of the formula

in which R and $R^2$ are the same as above, at least one compound of the formula

MOR in which R and M are the same as above, a compound of the formula

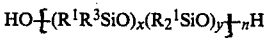

in which $R^1$, $R^3$, x, y and n are the same as above, and a compound or mixture of compounds of the formulas

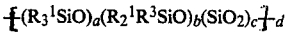

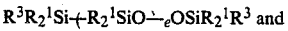

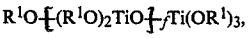

in which $R^1$, $R^3$, a, b, c, d, e and f are the same as above, and then reacting the mixture at temperatures of preferably from 50° C. to 150° C. in the presence of an organic solvent. This reaction is preferably carried out under the pressure of the surrounding atmosphere, that is to say, under 1,020 hPa (absolute) or about 1,020 hPa (absolute).

Examples of organic solvents which may be employed are organic, aromatic or aliphatic hydrocarbons. Specific examples of solvents which may be used are toluene, xylene or petroleum ether having various boiling fractions.

The silicon carbide fibers of this invention are obtained by known spinning processes, such as dry spinning, wet spinning or melt spinning, and more preferably by the melt spinning process. In this process, fibers having an average diameter of 5 to 50 um are spun from the melt and are crosslinked by heat, light, such as, for example, UV light, steam and/or atmospheric oxygen. The non-fusible fibers are bundled to a fiber bundle of 10 to 1,000 individual threads (filaments) and reacted in a tubular oven at a temperature of from 800° to 1,300° C., and more preferably from 1,050° to 1,150° C., under an inert atmosphere, such as obtained, for example, by a blanket of an inert gas, such as argon or nitrogen, or in vacuo.

The tensile strength of the silicon carbide fibers obtained according to this invention is 300 N/mm² for a 50 um thread and 3,000 N/mm² for a 10 um thread.

Silicon carbide fibers are generally used in fiber composites, preferably metals, such as aluminum and titanium, or ceramic materials, such as silicon carbide.

EXAMPLE 1

Preparation of the copolymer

A mixture containing 600 g (2.85 mol) of 1,2-dimethyl-1,1,2,2-tetramethoxydisilane, 900 g (4.90 mol) of 1,1,2-trimethyl-1,2,2-trimethoxydisilane, 40.5 g (2.7 percent by weight, based on the total weight of the disilanes) of dimethylmethoxysilane and 60 g of a vinylsiloxane of the formula

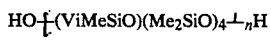

having an average molecular weight of 125,000 g/mol, increased rapidly from 25° to 90° C. after 6.0 g (0.4 percent by weight, based on the total weight of the disilanes) of sodium methylate were added. The mixture was then heated at 200°. About 1,115 g of a mixture containing dimethyldimethoxysilane and methyltrimethoxysilane were distilled off. About 490 g of residue were obtained.

EXAMPLE 2

Production of silicon carbide fiber

A mixture containing 42.6 g of dimethylpolysiloxane having vinyl end groups (average molecular weight about 40,000), 21.9 g of vinyl-waterglass and 21.5 g of polytitanium butylate was added to a solution containing 420 g of the copolymer prepared in Example 1 in 430 g of toluene. The mixture was then heated under reflux for 60 minutes. Thereafter, the solution was passed through a thin film evaporator at 250° C. under 5 mbar. About 435 g of a blue-gray polymer free from tackiness were obtained. The material is soluble and fusible (softening point 100° C.), and has an average molecular weight of 2,500 g/mol.

This polymer was spun in a melt spinning device with a 300 um jet at 120° C. under an argon pressure of 10 bar, the take-off speed being 60 m/minute. On discharge from the spinning jet, the fibers were blue-gray and were not transparent. The fibers were then passed through a heating zone 30 cm long (temperature about 100° C.) and past a UV source, whereupon they became colorless and transparent. The fibers thus obtained showed good tear strength and flexibility and were bundled to a yarn of 50 filaments.

This fiber bundle was heated up to 1,300° C. in a tubular oven blanketed with argon under a tensile stress of 50 g/mm². After being kept at 1,300° C. for 30 minutes, the fibers were withdrawn from the oven. The weight loss on pyrolysis was 18 to 20 percent by weight. The fibers are glossy black and have good flexibility and a tensile strength of a maximum of 2,700 N/mm² with an average diameter of 10 to 20 um.

What is claimed is:

1. A process for preparing silicon carbide fibers, which comprises spinning a copolymer obtained by reacting at least one disilane of the formula $$R_2R^1Si_2(OCH_3)_3$$

in which R is selected from the group consisting of alkyl, alkenyl, aryl radicals and mixtures thereof and $R^1$ is an alkyl radical, with at least one compound of the formula $$R_2R^2SiH$$

in which R is the same as above and $R^2$ is selected from the group consisting of a methoxy radical and R, in the presence of at least one compound of the formula $$MOR$$

in which R is the same as above and M is an alkali metal, which compound functions as a catalyst, and a compound of the formula $$HO{-}[(R^1R^3SiO)_x(R_2^1SiO)_y]{-}_nH$$

in which $R^1$ is the same as above, $R^3$ is an alkenyl radical, x is in the range of from 0.5 to 1.5, y is in the range of from 3 to 5 and n is in the range of from 500 to 2,000, into fibers and thereafter reacting the fibers under an inert atmosphere or in vacuo at temperatures in the range of from 800° to 1300° C.

2. The process of claim 1, wherein the disilane is mixed with a compound of the formula $$R_2Si_2(OCH_3)_4$$

in which R is selected from the group consisting of alkyl, alkenyl, aryl radicals and mixtures thereof.

3. The process of claim 1, wherein the copolymer is obtained by reacting at least one disilane of the formula $$R_2R^1Si_2(OCH_3)_3$$

in which R is selected from the group consisting of alkyl, alkenyl, aryl radicals and mixtures thereof and $R^1$ is an alkyl radical, with at least one compound of the formula $$R_2R^2SiH$$

in which R is the same as above and $R^2$ is selected from the group consisting of a methoxy radical and R, in the presence of at least one compound of the formula $$MOR$$

in which R is the same as above and M is an alkali metal, which compound functions as a catalyst, and a compound of the formula $$HO{-}(R^1R^3SiO)_x(R_2^1SiO)_y{-}_nH$$

in which $R^1$ is the same as above, $R^3$ is an alkenyl radical, x is in the range of from 0.5 to 1.5, y is in the range of from 3 to 5 and n is in the range of from 500 to 2,000, and a compound or a mixture of the compounds of the formulas $$[(R_3^1SiO)_a(R_2^1R^3SiO)_b(SiO_2)_c]{-}_d$$

$$R^3R_2^1Si{+}R_2^1SiO{+}_eOSiR_2^1R^3 \text{ and}$$

$$R^1O{-}[(R^1O)_2TiO]_f Ti(OR^1)_3,$$

in which $R^1$ and $R^3$ are the same as above, a is in the range of from 0.3 to 0.5, b is in the range of from 0.01 to 0.1, c is in the range of from 0.5 to 0.7, d is in the range of from 10 to 100, e is in the range of from 500 to 600 and f is in the range of from 1 to 1,000.

4. The process of claim 3, wherein the disilane is mixed with a compound of the formula $$R_2Si_2(OCH_3)_4$$

in which R is selected from the group consisting of alkyl, alkenyl, aryl radicals and mixtures thereof.

* * * * *